(12) United States Patent
Park

(10) Patent No.: US 7,012,859 B2
(45) Date of Patent: Mar. 14, 2006

(54) METHOD AND APPARATUS FOR CONTROLLING REPRODUCTION OF OPTICAL RECORDING MEDIUM

(75) Inventor: Sang On Park, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 156 days.

(21) Appl. No.: 09/968,678

(22) Filed: Oct. 1, 2001

(65) Prior Publication Data

US 2002/0048235 A1    Apr. 25, 2002

(30) Foreign Application Priority Data

Oct. 2, 2000    (KR) ............................ 2000-57907

(51) Int. Cl.
*G11B 7/095*    (2006.01)

(52) U.S. Cl. ............................ 369/44.25; 369/44.28; 369/53.28

(58) Field of Classification Search ............ 369/44.25, 369/44.28, 44.29, 53.28, 30.16
See application file for complete search history.

(56) References Cited

U.S. PATENT DOCUMENTS

| | | | | |
|---|---|---|---|---|
| 4,443,869 A | * | 4/1984 | Ammon | 369/30.01 |
| 4,817,069 A | * | 3/1989 | Shigemori | 369/44.28 |
| 4,924,455 A | * | 5/1990 | Fujiie et al. | 369/44.21 |
| 4,982,393 A | * | 1/1991 | Matsushita et al. | 369/44.32 |
| 5,022,021 A | * | 6/1991 | Ito | 369/44.11 |
| 5,148,425 A | * | 9/1992 | Sakata | 369/44.25 |
| 5,245,598 A | * | 9/1993 | Burroughs | 369/44.28 |
| 5,859,816 A | * | 1/1999 | Yamamoto | 369/44.25 |
| 5,956,304 A | * | 9/1999 | Supino et al. | 369/44.34 |
| 5,978,329 A | * | 11/1999 | Ceshkovsky | 369/44.28 |
| 6,351,437 B1 | * | 2/2002 | Takano et al. | 369/44.29 |
| 6,603,716 B1 | * | 8/2003 | Tateishi et al. | 369/44.26 |

FOREIGN PATENT DOCUMENTS

EP    491573 A2    *  6/1992

* cited by examiner

*Primary Examiner*—Brian E. Miller
*Assistant Examiner*—Peter Vincent Agustin
(74) *Attorney, Agent, or Firm*—Lee, Hong, Degerman, Kang & Schmadeka

(57) ABSTRACT

A method and apparatus for controlling reproduction of an optical recording medium is disclosed. According to the method and apparatus, a moving direction of an object lens on a disc is detected from a slope of a differential phase detection (DPD) error signal in case that the tracking control of the disc is performed by the DPD error signal, and the tracking control is performed using the detected moving direction of the object lens. Thus, the proceeding direction of the object lens can be easily and accurately detected in the disc from which the detection of a mirror signal is not facilitated, i.e., in the disc whose tracking is controlled by the DPD error signal during reproduction. Since it can be easily discriminated whether the phase of the tracking error signal to be in a track-on state when a track servo is turned on is a land or a groove, the stability of the servo can be secured, and an automatic breaking can be achieved.

19 Claims, 10 Drawing Sheets

METHOD AND APPARATUS FOR CONTROLLING REPRODUCTION OF OPTICAL RECORDING MEDIUM

CROSS REFERENCE TO RELATED ART

This application claims the benefit of Korean Patent Application No. 2000-0057907, filed on Oct. 2, 2000, the contents of which is hereby incorporated by reference in its entirety.

BACKGROUND OF THE INVENTION

1. Field of the Invention

The present invention generally relates to an optical recording medium system, and more particularly, to a method and apparatus for controlling reproduction of an optical recording medium that generates a servo control signal by detecting the direction of an object lens in a high-density optical recording medium.

2. Background of the Related Art

Generally, an optical disc recording/reproducing apparatus is an apparatus for recording/reproducing data on/from an optical recording medium, i.e., optical disc such as a compact disc (CD), digital versatile disc (DVD), etc.

At this time, as rewritable digital versatile discs, there exist a rewritable DVD (DVD-RW), recordable DVD (DVD-R), DVD-RAM, etc.

According to the DVD-RAM, data is written on both a land and a groove, and according to the DVD-RW/R, data is written on the groove only. That is, according to the DVD-RW/R, positional information is written on a groove track by pre-pitting a land track instead of a header region of the DVD-RAM that represents the positional information, but the data is not written on the land track. In other words, information on a physical address of the groove track is written in advance on the land in the form of a pit.

FIG. 1 is a block diagram illustrating the construction of a general optical disc recording/reproducing apparatus for recording and reproducing data in the above-described DVD series optical discs. Referring to FIG. 1, an optical pickup 102, under the control of a servo control section 104, puts an optical beam condensed by an object lens on a signal track of an optical disc. The optical beam reflected from a signal recording surface of the optical disc is condensed through the object lens, and then incident to an optical detector for detection of a focus error signal and a tracking error signal.

The optical detector is composed of a plurality of optical detection elements, and electric signals in proportion to light quantities obtained by the respective optical detection elements are outputted to an RF and servo error generating section 103.

The RF and servo error generating section 103 detects an RF signal for data reproduction, focus error (FE) signal for servo control, tracking error (TE) signal, etc., from the electric signals outputted from the respective optical detection elements of the optical detector.

The detected RE signal is outputted to a data decoder for reproduction, and the servo error signals such as the FE and TE signals are outputted to the servo control section 104.

The servo control section 104 processes the focus error (FE) signal to output a driving signal for focus control to a focus servo driving section 105, and processes the tracking error (TE) signal to output a driving signal for tracking control to a tracking servo driving section 106.

Then, the focus servo driving section 105 moves the optical pickup 102 up and down by driving a focus actuator in the optical pickup 102, so that the optical pickup 102 follows the up/down movement of the rotating optical disc 101.

The tracking servo driving section 106 moves the object lens of the optical pickup 102 in a radial direction by driving a tracking actuator in the optical pickup 102, and thus corrects the position of the beam to follow a specified track.

The RF and servo error generating section 103 and servo control section 104 generally use various kinds of tracking control methods such as a three-beam method, push-pull (PP) method, differential phase detection (DPD) method, etc., for the tracking control in the DVD series optical discs.

According to the push-pull (PP) method, the optical detection elements of the optical detector for detecting the optical beam reflected from the optical disc are divided into two parts in a track direction, and the tracking error signal is detected from a light quantity balance of the two-divided optical detection elements. Specifically, this method uses the fact that the intensity distribution of light, that is diffracted and reflected by a pit and then incident again to the object lens, varies according to the relative positional change of the pit and the spot.

At this time, if the shadow of the pit is equally detected by the both optical detection elements, the tracking error (TE) signal becomes "0", and this state is called a tracking-on (or on-track) state. On the contrary, if the optical beam deviates left or right from the track center, the tracking error (TE) signal has a positive (+) or negative (−) value, and this state is called a tracking-off (or off-track) state.

The PP method has several conditions. According to one among them, if the wavelength of the light is λ and the depth of the pit is λ/4, i.e., if the diffraction by the pit is most effective and the depth of modulation becomes maximum, the tracking error signal cannot be obtained through the PP method. In other words, since the incident light and the reflected light are offset due to an interference therebetween if the depth of the pit is λ/4, the tracking error signal cannot be obtained through the 2-divided optical detector.

Meanwhile, the DPD method is an improvement of the PP method. In the same manner as the PP method, the DPD method uses the intensity distribution of light according to the relative positional change of the beam and pit, but it uses a 4-divided optical detector instead of the 2-divided optical detector.

Specifically, according to the DPD method, the intensity distribution of light is received through the 4-divided optical detector, and the tracking error signal is generated through the detection of phase difference in the radial direction.

Accordingly, the tracking error signal is outputted even if the depth of the pit is λ/4, and is not much affected by the movement of the beam on the optical detector as well.

For example, as shown in FIG. 2, in case that the optical detector is composed of 4 optical detection elements PDA, PDB, PDC, and PDD divided in the signal track direction and radial direction of the optical disc, the optical detector outputs electric signals a, b, c, and d in proportion to the light quantities obtained by the respective optical detection elements PDA, PDB, PDC, and PDD.

At this time, the DPD method obtains the tracking error (TE) signal through the detection of the phase difference between diagonal difference signals, i.e., between the electric signal of "a+c" and the electric signal of "b+d" at a slice point of the RF signal of "a+b+c+d" obtained from the electric signals a, b, c, and d outputted from the optical detector. That is, by detecting the phase difference, the positive TE signal can be obtained. As described above, the TE signal according to the DPD method is generated using the phase difference in the radial direction detected while the object lens passes the pit on the track.

As shown in FIG. 3(b), if the track is in the center of the beam, the DPD signal becomes zero, and this value is maintained even if the beam moves in a direction as indicated as an arrow by the rotation of the disc. This means that the phase difference signal in the diagonal direction is not generated.

Meanwhile, as shown in FIGS. 3(a) and 3(c), if the beam deviates from the track and moves in a direction as indicated as an arrow, the DPD signal becomes an output of sine wave. The phase of the sine wave deviates by ±90° with respect to that of the RF signal. Thus, by detecting the phase of the DPD signal at the slice point of the RF signal based on the RF signal, the positive and negative tracking error signals can be obtained.

Hereinafter, the tracking error signal obtained through the PP method is referred to as a PP signal, and the tracking error signal obtained through the DPD method is referred to as a DPD signal.

Also, in case that the optical detector is divided into two in the track direction, the tracking error signal is detected from the light quantity balance of both photodiodes I1 and I2 through the PP method. That is, the electric signals a and d correspond to the photodiode I1, and the electric signals b and c correspond to the photodiode I2.

At this time, the DVD-ROM generates the tracking error signal using the DPD method. Specifically, since the depth of the pit is λ/4 in case of the DVD-ROM, the tracking error signal cannot be detected through the PP method. Thus, the DVD-ROM obtains the tracking error signal using the DPD method. Also, the DVD-R or DVD-RW detects the tracking error signal using the DPD method in case of reproducing a region where the signal is recorded, while it detects the tracking error signal using the PP method in case of recording the signal. Also, the DVD-RAM detects the tracking error signal using the DPD method only with respect to a pre-pit region, while it detects the tracking error signal using the PP method with respect to other regions.

Accordingly, in controlling the above-described DVD-series optical disc, it is very important to detect the land and the groove.

For example, in case of the DVD-RW/R where data has already been written, a mirror signal is generated using the difference of radial contrast (RC), and the track (i.e., pit or groove) and the mirror (i.e. land) are discriminated using the mirror signal.

This is because it is the best time point for the track-on when the object lens of the tracking actuator is in a direction of an outer periphery and the head of the optical pickup is in the center of the groove simultaneously.

However, if the RC is too small to be detected, i.e., if it is difficult to secure the RC due to the high-density and high-speed operation and the mirror is not properly detected as well, it becomes difficult to perform the land/groove discrimination and also an automatic breaking system does not operate. This causes the servo to be unstable during the track-on.

SUMMARY OF THE INVENTION

Accordingly, the present invention is directed to a method and apparatus for controlling reproduction of an optical recording medium that substantially obviates one or more problems due to limitations and disadvantages of the related art.

An object of the present invention is to provide a method and apparatus for controlling reproduction of an optical recording medium that detects a moving direction of an object lens on a disc from a slope of a differential phase detection (DPD) error signal in case that the tracking control of the disc is performed by the DPD error signal, and performs the tracking control using the detected moving direction of the object lens.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling reproduction of an optical recording medium comprises the steps of receiving an electric signal in proportion to a quantity of reflected light outputted from an optical pickup, generating a tracking error signal by a differential phase detection (DPD) method, and obtaining a slope difference with respect to positive (+) and negative (−) directions of the tracking error signal; and determining a track-on time point from the slope difference, and performing a track-on accordingly.

Preferably, the step of obtaining the slope difference comprises the steps of comparing the tracking error signal with a first reference level and outputting a first logic signal of a high or low state according to a result of comparison, comparing the tracking error signal with a second reference level and outputting a second logic signal of a high or low state according to a result of comparison, outputting a third logic signal by exclusive-OR-gating the first and second logic signals, and obtaining the slope difference with respect to the positive (+) and negative (−) directions of the tracking error signal by comparing times of the third logic signals generated within an active region of the second logic signal.

Here, the first reference level is determined to be higher than a level of a track center, and the second reference level is determined to be lower than the level of the track center.

Preferably, the step of performing the track-on further comprises the step of detecting a proceeding direction of an object lens from a rate of the time of the third logic signal generated at a rising edge of the second logic signal to the time of the third logic signal ending at a falling edge of the second logic signal.

Preferably, the step of detecting the direction of the object lens judges the direction of the object lens to be a direction of an outer periphery if a pulse width of the third logic signal generated at the rising edge of the second logic signal is larger than a pulse width of the third logic signal ending at the falling edge of the second logic signal, while judging the direction of the object lens to be a direction of an inner periphery if the pulse width of the third logic signal generated at the rising edge of the second logic signal is smaller than the pulse width of the third logic signal ending at the falling edge of the second logic signal, and generating a directing signal of the object lens corresponding to a result of judgment.

Preferably, at the step of performing the track-on, the track-on is performed in the track center where the proceeding direction of the object lens is judged to be the direction of the outer periphery and the direction having a small rate of phase variation is judged according to the slope difference of the tracking error signal.

Preferably, the step of performing the track-on further comprises the step of judging the direction having a small rate of phase variation according to the slope difference of the tracking error signal to be a groove track.

Preferably, the step of performing the track-on further comprises the step of generating a break pulse signal whose direction is opposite to the moving direction of the object lens if the direction of the object lens is detected.

In another aspect of the present invention, an apparatus for controlling reproduction of an optical recording medium comprises a slope operation section for receiving an electric signal in proportion to a quantity of reflected light outputted from an optical pickup, generating a tracking error signal by a differential phase detection (DPD) method, and obtaining a slope with respect to positive (+) and negative (−) directions of the tracking error signal; and a control section for detecting a proceeding direction of an object lens from the slope, determining a track-on time point by discriminating a kind of a track, and performing a track control accordingly.

Preferably, the slope operation section comprises a first comparison section for comparing the tracking error signal with a first reference level and outputting a first logic signal of a high or low state according to a result of comparison, a second comparison section for comparing the tracking error signal with a second reference level and outputting a second logic signal of a high or low state according to a result of comparison, and a logic operation section for outputting a third logic signal by exclusive-OR-gating the first and second logic signals.

Preferably, the control section judges the direction of the object lens to be a direction of an inner periphery if a rate of a time of the third logic signal generated at a rising edge of the second logic signal to a time of the third logic signal ending at a falling edge of the second logic signal is larger than a predetermined threshold value, while judging the direction of the object lens to be a direction of an outer periphery if the rate of the time of the third logic signal generated at the rising edge of the second logic signal to the time of the third logic signal ending at the falling edge of the second logic signal is smaller than the predetermined threshold value.

Preferably, the control section performs a track-on in a track center where the moving direction of the object lens is judged to be the direction of the outer periphery and the direction having a small rate of phase variation is judged according to the slope difference with respect to the positive (+) and negative (−) directions of the tracking error signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Typically, as an optical beam passes a pit line (i.e., groove track) or a land having no pit (i.e., mirror), the corresponding variations of phase difference of a DPD error signal are quite different from each other. Specifically, when the optical beam passes the pit line, the phase slope of a diagonal component is slow based on an RF signal, while when the optical beam passes the mirror (or land) region, the phase variation of the diagonal component becomes great to vary the slope abruptly. Accordingly, the center of the pit line is a position most suitable for operating a track servo.

According to the present invention, the direction of an object lens is detected by obtaining the slope of the DPD error signal, and the track control is performed using the direction of the object lens.

Figure 4:
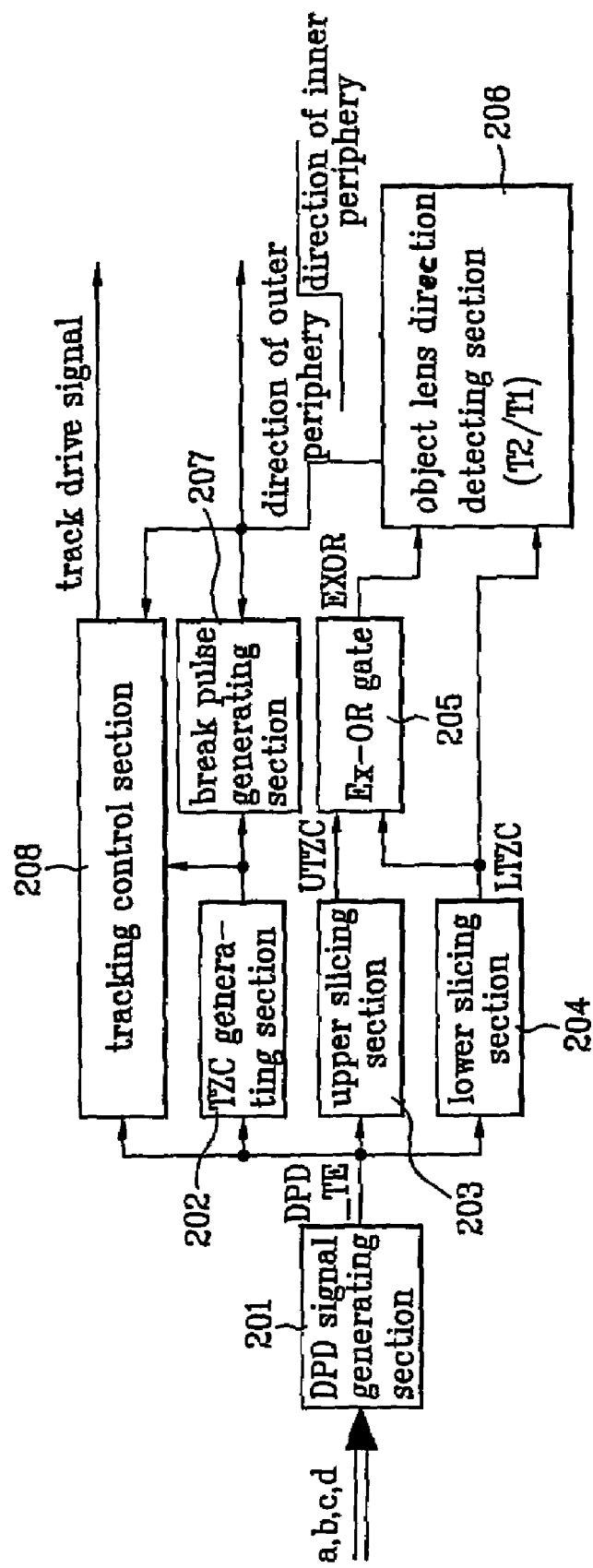
FIG. 4 is a block diagram illustrating the construction of an optical recording/reproducing apparatus according to the present invention.
Figure 5:
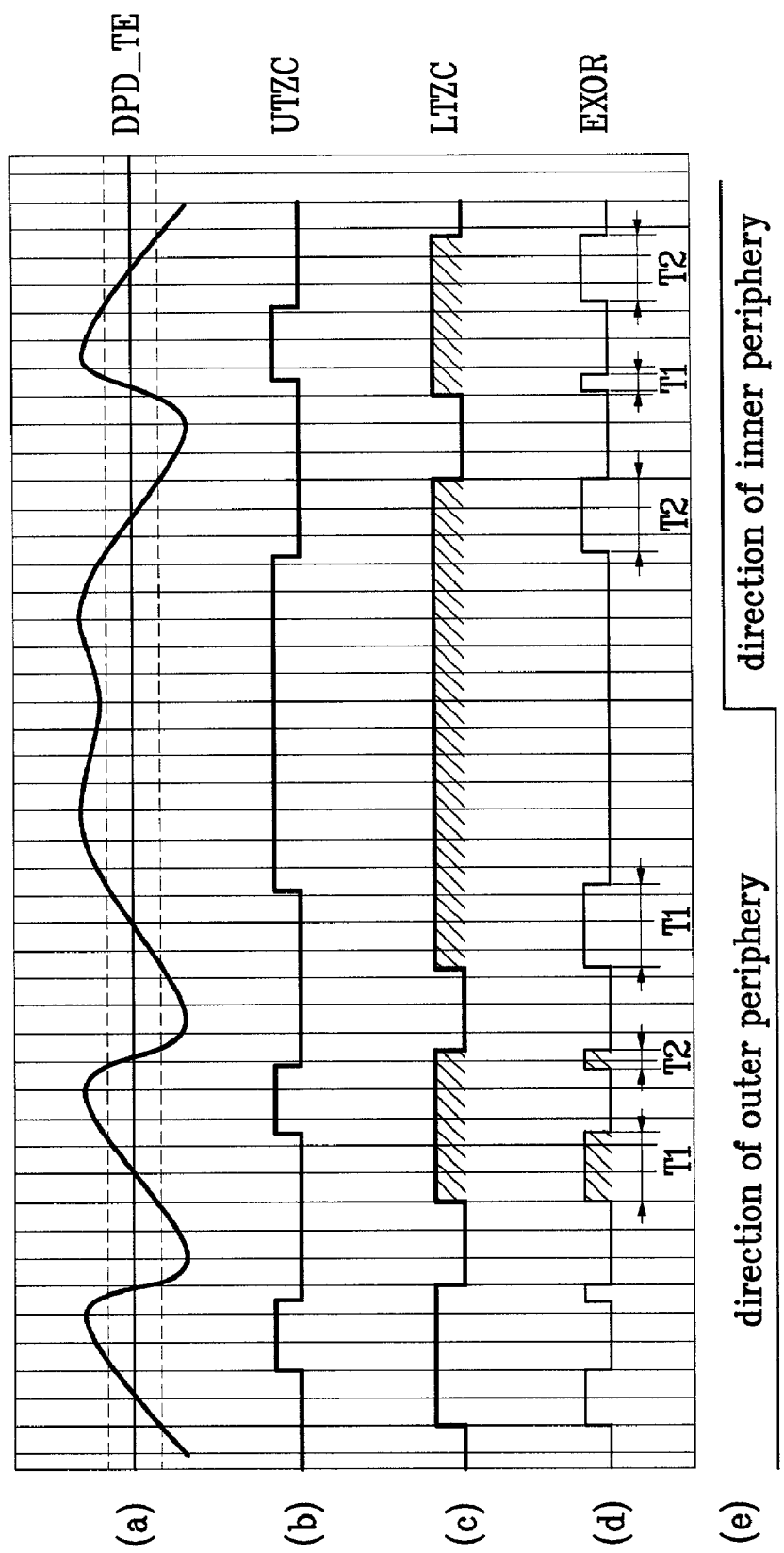
FIGS. 5(a) to 5(e) through 10(a) to 10(e) are waveform diagrams illustrating waveforms appearing at various parts of FIG. 4, wherein (a) illustrates a waveform of a DPD error signal, (b) a waveform of an upper-sliced signal, (c) a waveform of a lower-sliced signal, (d) a waveform of a signal obtained by exclusive-OR-gating the waveforms of (b) and (c), and (e) a waveform of a direction signal of an object lens.
Figure 6:
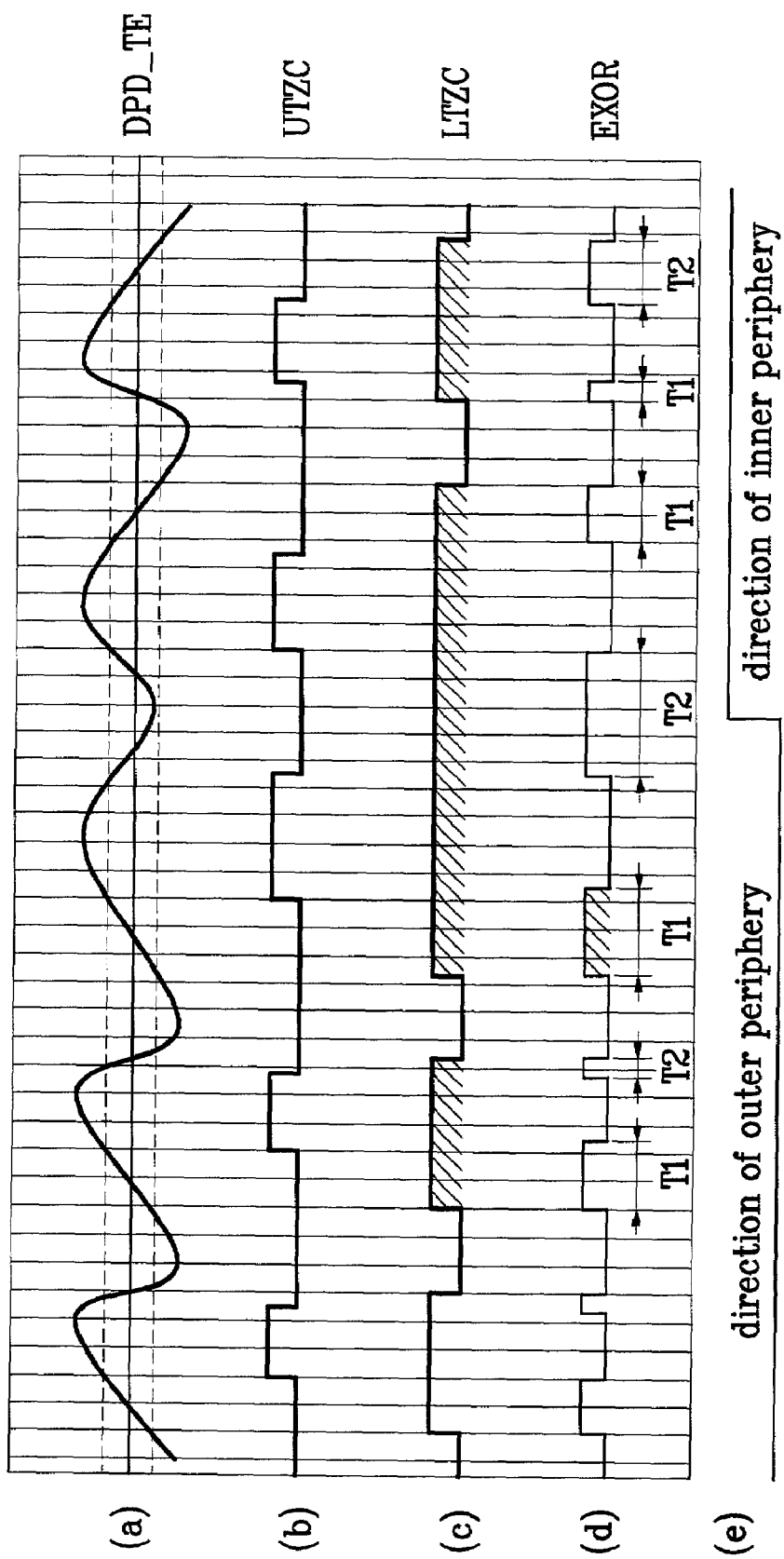
Figure 7:
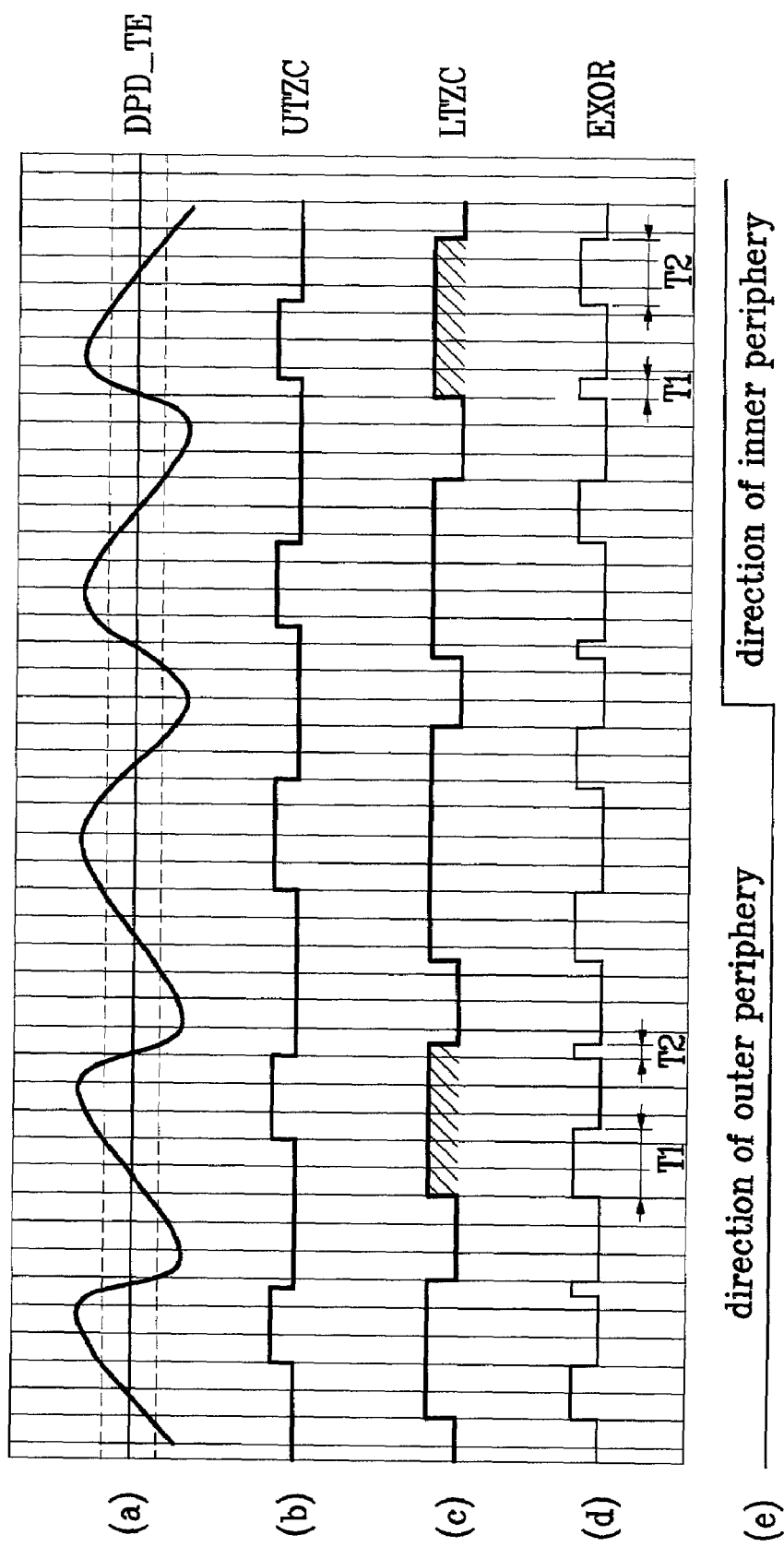
Figure 8:
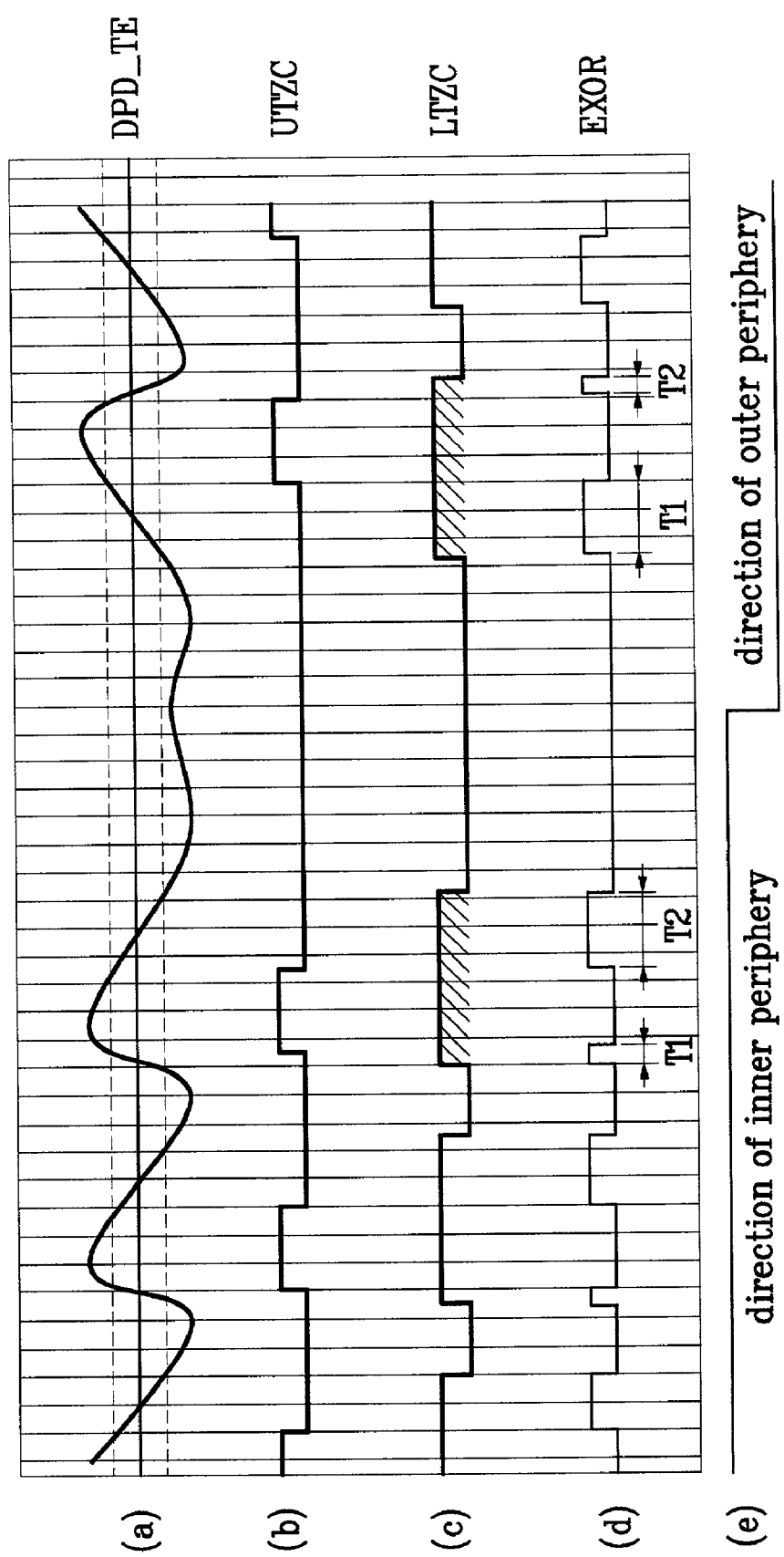
Figure 9:
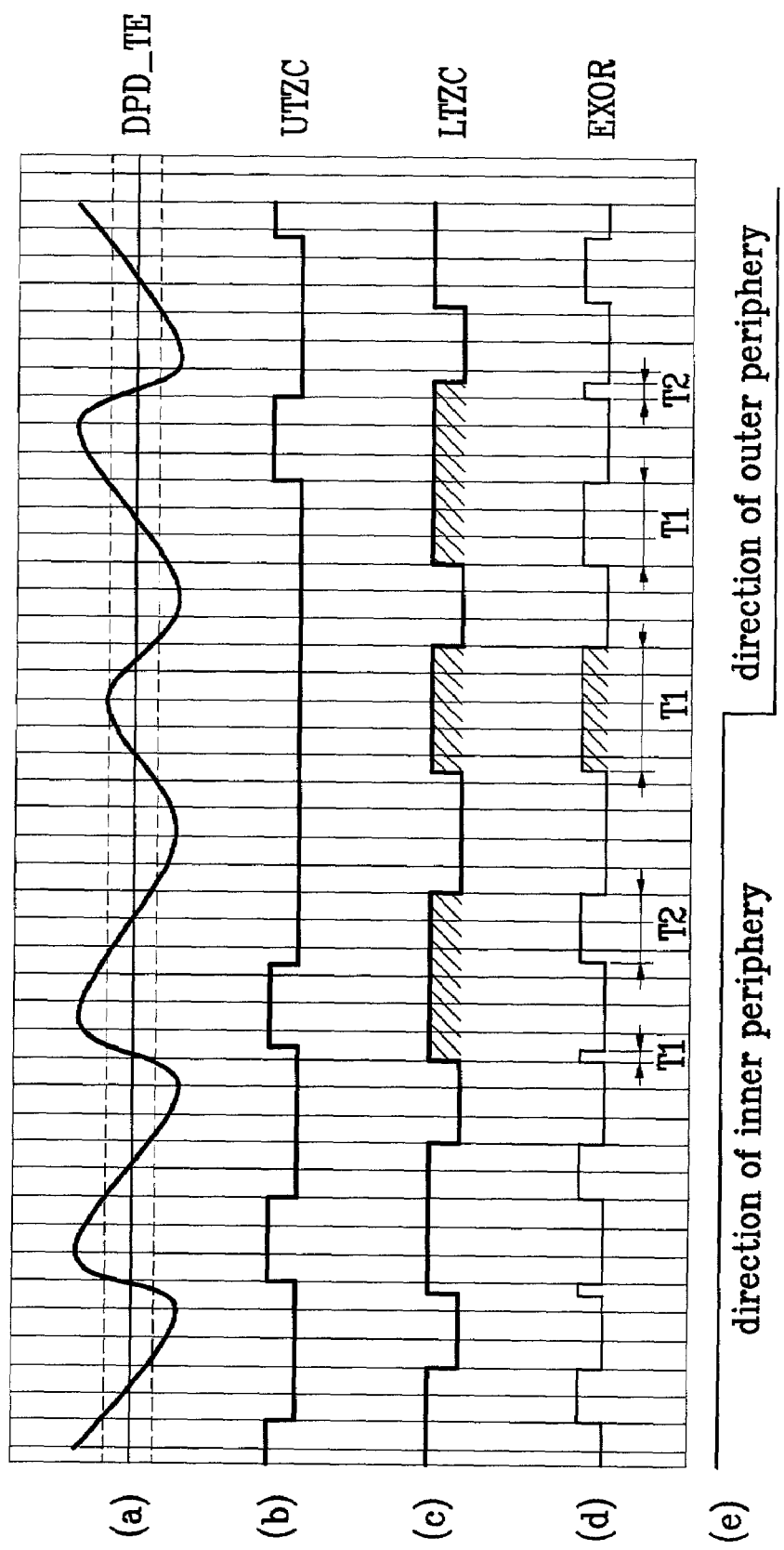
Figure 10:
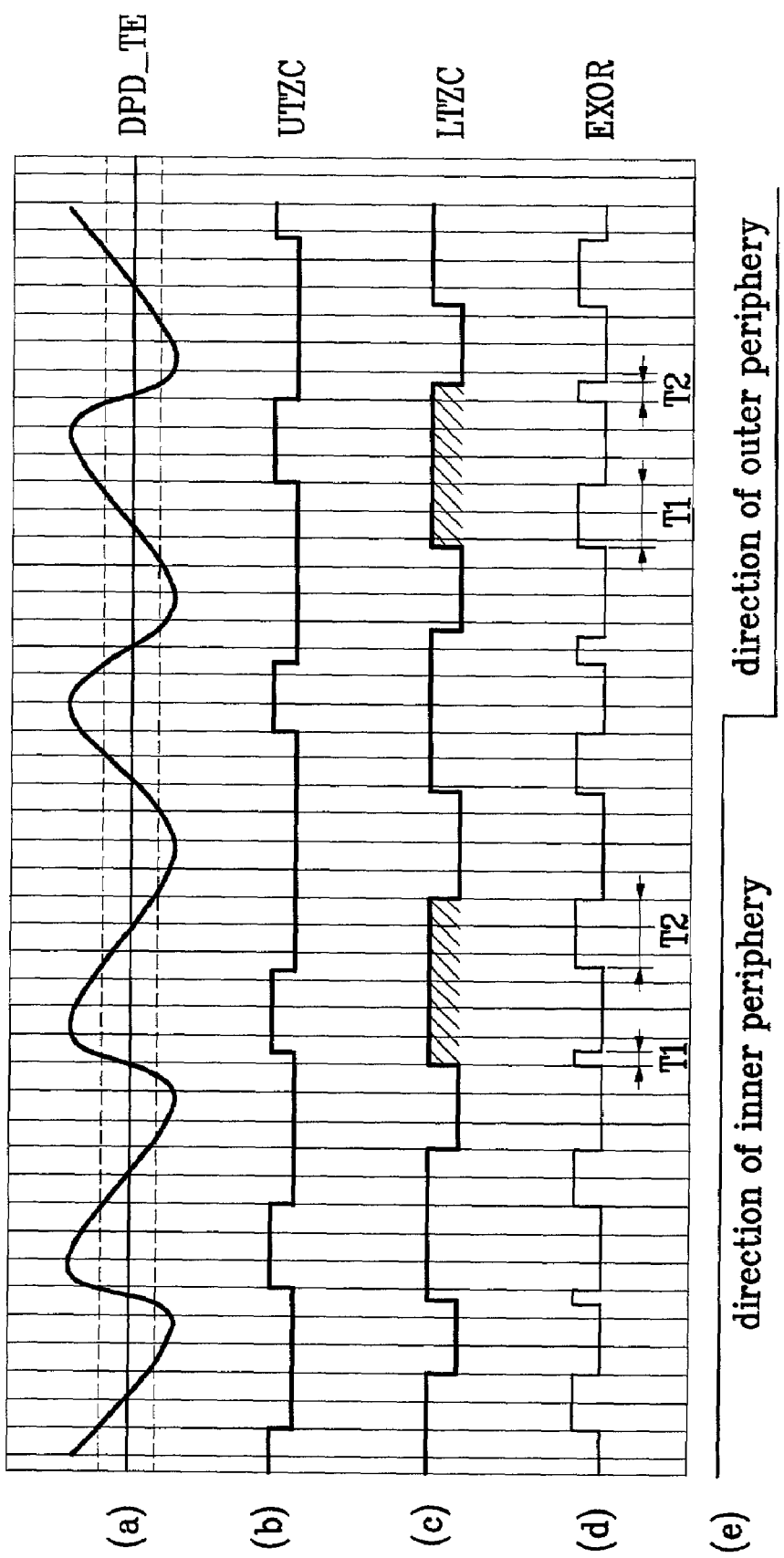

FIG. 4 is a block diagram illustrating the construction of an optical recording/reproducing apparatus according to the present invention. In FIG. 4, a track control part of the optical recording medium using the DPD error signal is illustrated.

Referring to FIG. 4, the apparatus includes a DPD signal generating section 201 for receiving electric signals a, b, c, and d outputted from an optical detector in an optical pickup 102 and generating a tracking error signal DPD_TE by a DPD method, a track zero cross (TZC) generating section 202 for generating a TZC signal using the DPD error signal DPD_TE, an upper slicing section 203 for slicing the DPD error signal DPD_TE with a predetermined upper slice level, a lower slicing section 204 for slicing the DPD error signal DPD_TE with a predetermined lower slice level, an exclusive OR gate 205 for exclusive-OR-gating outputs of the upper and lower slicing sections 203 and 204, an object lens direction detecting section 206 for detecting a moving direction of the object lens using an output of the exclusive OR gate 205 and the output of the lower slicing section 204, a break pulse generating section 207 for generating a break pulse signal using the direction of the object lens and the TZC signal, and a tracking control section 208 for generating a tracking drive signal using the break pulse signal and the DPD error signal.

FIGS. 5(a) to 5(e) through 7(a) to 7(e) are waveform diagrams illustrating waveforms appearing at various parts of FIG. 4 when the proceeding direction is the groove center, i.e., when the object lens proceeds in the direction of the outer periphery with respect to the track, and show examples of the DPD error signals having different turning points. At this time, it can be seen that the phase slope of the diagonal component is slow based on the RF signal when the optical beam passes the groove track (i.e., the track where the pit is formed). Here, (a) illustrates the DPD error signal, (b) upper-sliced signal, (c) lower-sliced signal, (d) exclusive-OR-gated signal of (b) and (c), and (e) direction signal of the object lens, respectively.

Also, FIGS. 8(a) to 8(e) through 10(a) to 10(e) are waveform diagrams illustrating waveforms appearing at various parts of FIG. 4 when the proceeding direction is the land center, i.e., when the object lens proceeds in the direction of the inner periphery with respect to the track, and show examples of the DPD error signals having different turning points. At this time, it can be seen that the phase slope of the diagonal component is abrupt based on the RF signal when the optical beam passes the land track. In the same manner as above, (a) illustrates the DPD error signal, (b) upper-sliced signal, (c) lower-sliced signal, (d) exclusive-OR-gated signal of (b) and (c), and (e) direction signal of the object lens, respectively.

Figure 1:
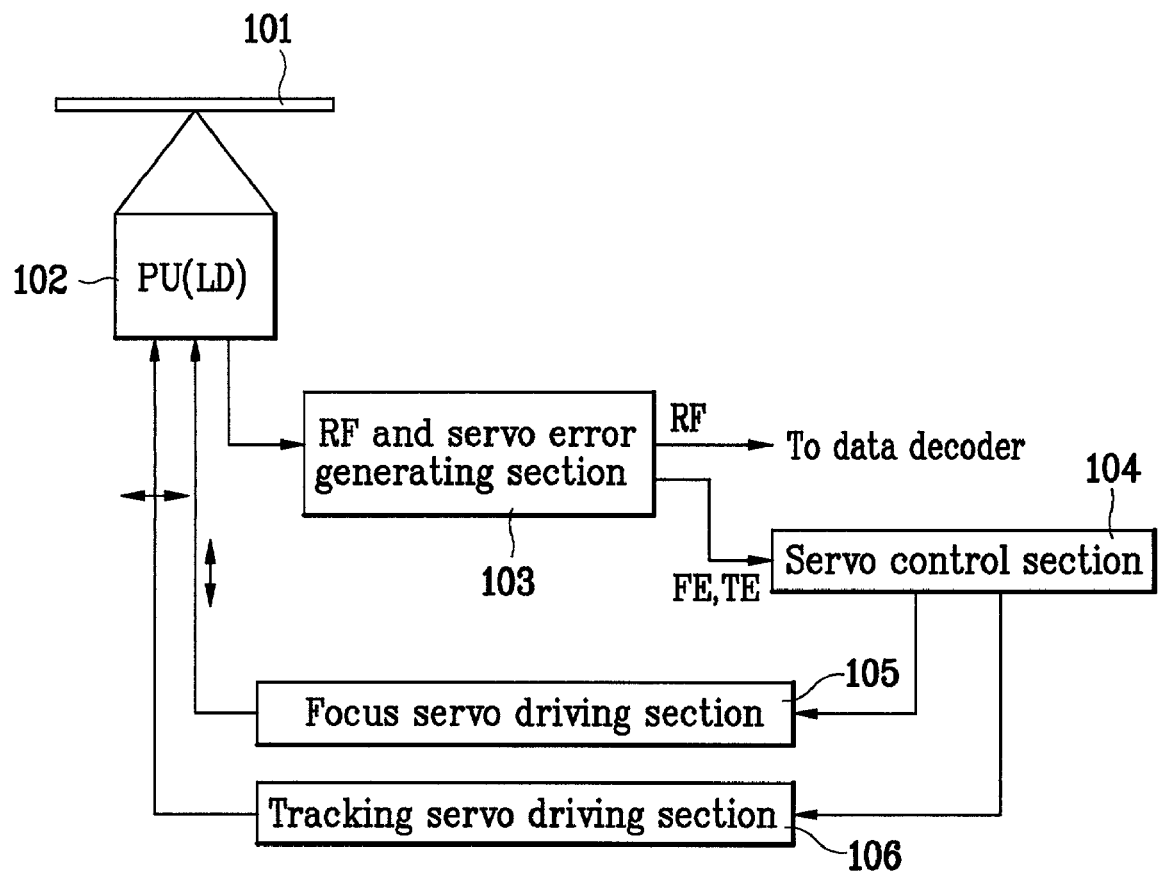
FIG. 1 is a block diagram illustrating the construction of a general optical disc recording/reproducing apparatus.
Figure 2:
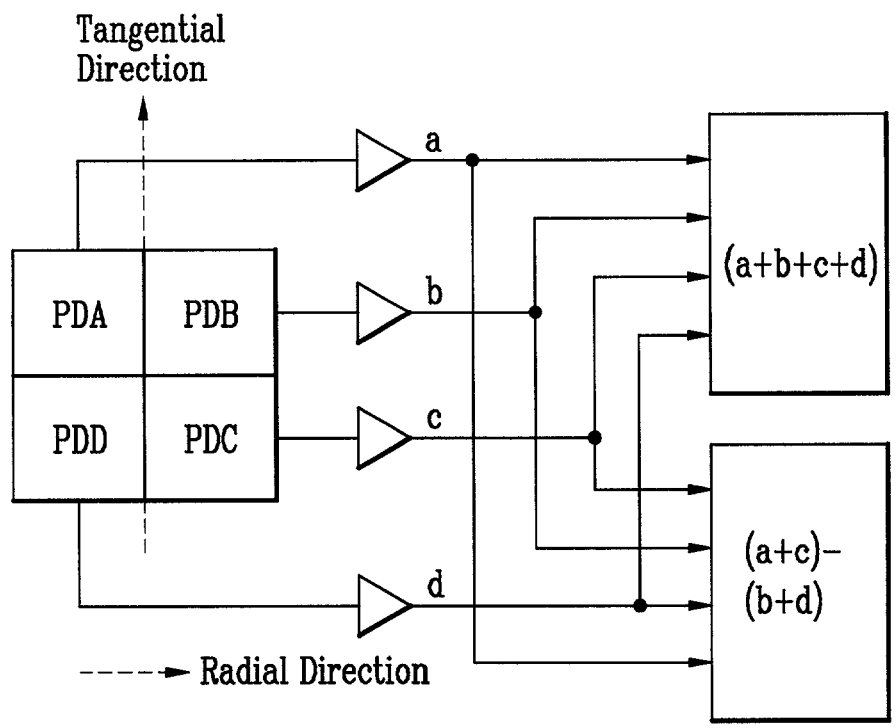
FIG. 2 is a view illustrating an example of a general optical detector that generates a tracking error signal using a DPD method.
Figure 3:
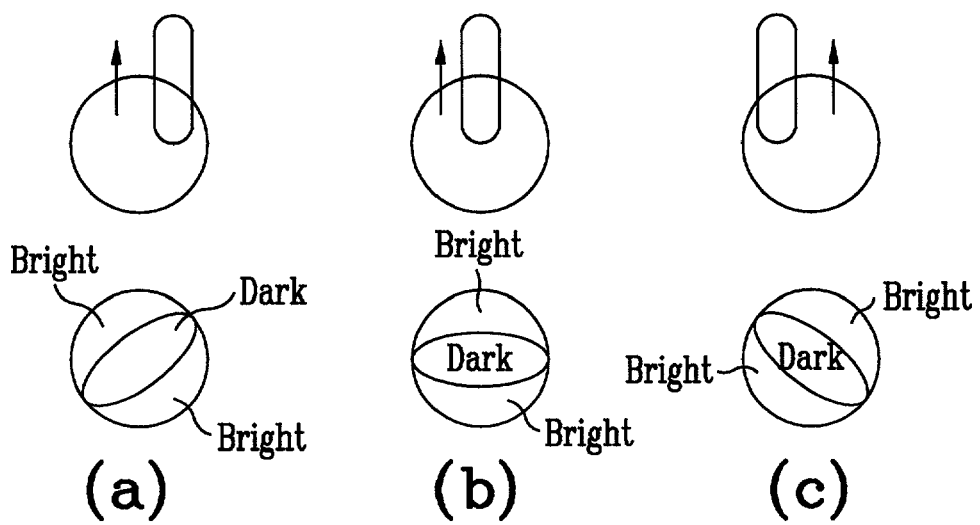
FIGS. 3(a) to 3(c) are views illustrating the principle of a general DPD method.

If it is assumed that the optical detector in the optical pickup 102 is constructed as shown in FIG. 2, the DPD signal generating section 201 receives the electric signals $a$, $b$, $c$, and $d$ outputted from the optical detector, and generates the DPD error signal DPD_TE as shown in FIGS. 5(a) to 10(a) by generating the $\overline{RF}$ signal and then obtaining the phase difference between $(a+c)$ and $(b+d)$ at the RF slice point based on the RF signal. The TZC generating section 202 generates the TZC signal by slicing the DPD error signal DPD_TE with an internal reference level, i.e., with a center level. In other words, the TZC signal is a signal that is turned on/off at a track cross time point.

Meanwhile, the upper slicing section 203 outputs a high-level signal as shown in FIGS. 5(b) to 10(b) to the exclusive OR gate 205 if the DPD error signal DPD_TE is higher than the predetermined upper slice level. The lower slicing section 204 outputs a high-level signal as shown in FIGS. 5(c) to 10(c) to the exclusive OR gate 205 and the object lens direction detecting section 206 if the DPD error signal DPD_TE is lower than the predetermined lower slice level. Here, the upper slice level is determined to be higher than the track center level, and the lower slice level is determined to be lower than the track center level.

The exclusive OR gate 205 exclusive-OR-gates the upper-sliced DPD error signal and the lower-sliced DPD error signal. If the two signals have the same level (i.e., 00 or 11), the exclusive OR gate 205 outputs a low-level signal to the object lens direction detecting section 206, while, if the two signals have different levels from each other (i.e., 01 or 10), it outputs a high-level signal to the object lens direction detecting section 206 as shown in FIGS. 5(d) to 10(d).

The object lens direction detecting section 206 detects the direction of the object lens from the output of the exclusive OR gate 205 using the lower-sliced signal as a window. For example, if it is assumed that the pulse time of the exclusive OR gate 205 generated at the rising edge of the lower-sliced signal is T1 and the pulse time of the exclusive OR gate 205 ending at the falling edge of the lower-sliced signal is T2, the direction of the object lens can be detected by comparing sizes of the signals T1 and T2. That is, by obtaining the rate of T2/T1, the phase difference between the rising and falling edges of the DPD error signal DPD TE can be obtained.

If $T2/T1<1-\delta$, it presents the case that the object lens moves in the direction of the outer periphery. That is, the object lens proceeds in the direction of the outer periphery with respect to the track. Here, $\delta$ is a threshold value experimentally obtained to detect the direction of the object lens.

Also, if $T2/T1>1+\delta$, it presents the case that the object lens moves in the direction of the inner periphery. That is, the object lens proceeds in the direction of the inner periphery with respect to the track.

At this time, the object lens direction detecting section 206 outputs a logic signal according to a result of judgment. In the embodiment of the present invention, it outputs a low-level signal if the moving direction of the object lens is the direction of the outer periphery, while it outputs a high-level signal if the moving direction of the object lens is the direction of the inner periphery.

Also, if $1-\delta<T2/T1<1+\delta$, it presents a turning point where the object lens slowly crosses the track. In other words, the turning point is a point where the cross of the object lens with the track is changed from the inner periphery to the outer periphery, or from the outer periphery to the inner periphery.

As shown in FIGS. 5(a) to 10(a), various kinds of DPD error signals may be generated at the turning point, and the object lens direction detecting section 206 can detect the turning point from the lower-sliced signal and the output of the exclusive OR gate 205. For example, if the exclusive OR gate 205 outputs two pulses within the lower-sliced signal, i.e., in the window, the object lens direction detecting section judges it to be a normal state, and proceeds with detection of the direction of the object lens. If the exclusive OR gate 205 outputs a plurality of pulses (for example, three pulses) or a single pulse within the window, the object lens direction detecting section judges it to be the turning point where the object lens changes its direction from the outer periphery to the inner periphery and vice versa. If the turning point is judged, the object lens direction detecting section 206 changes the object lens direction signal.

The object lens direction signal detected by the object lens direction detecting section 206 is outputted to the break pulse generating section 207 and to the tracking control section 208.

Figure 11:
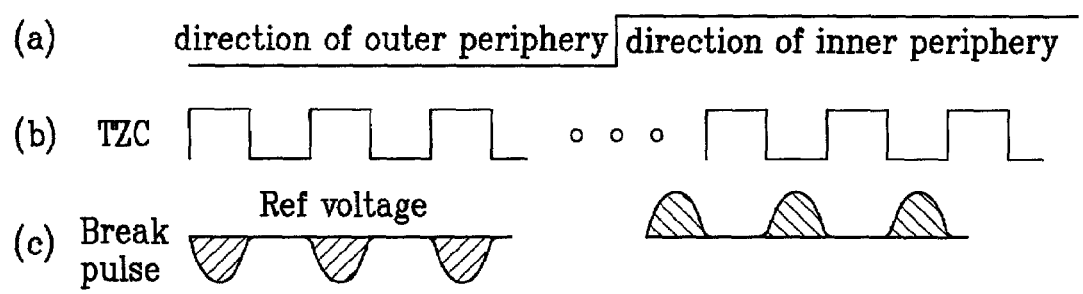
FIG. 11(a) is a timing diagram illustrating an example of the direction signal of the object lens according to the present invention.
FIG. 11(b) is a waveform diagram of a TZC signal detected from the DPD error signal according to the present invention.
FIG. 11(c) is a waveform diagram of a break pulse signal generated according to the direction signal of the object lens.

The break pulse generating section 207 generates the break pulse signal according to the TZC signal outputted from the TZC generating section 202 and the object lens direction signal outputted from the object lens direction detecting section 206. For example, if the object lens direction detecting section 206 outputs a low-level signal as shown in FIG. 11(a), i.e., if it is judged that the object lens proceeds in the direction of the outer periphery, the break pulse generating section 207 outputs the break pulse signal as shown in FIG. 11(c) whose phase is opposite to that of the TZC signal as shown in FIG. 11(b). If the object lens direction detecting section 206 outputs a high-level signal, i.e., if it is judged that the object lens proceeds in the direction of the inner periphery, the break pulse generating section 207 outputs the break pulse signal whose phase is the same as that of the TZC signal to the tracking control section 208. Consequently, the break pulse signal has the phase opposite to that of the TE signal. This is because the breaking of the tracking actuator can be effected by applying the break pulse in the opposite direction to the TE signal.

The tracking control section 208 performs the tracking control in a manner that it generates the tracking control signal using the TE signal during a normal servo, while it generates the tracking control signal using the break pulse signal generated from the break pulse generating section 207 during a track-on after a track jump or free running. This results in stable and rapid control.

As described above, the best track-on time point is when the object lens of the tracking actuator is in the direction of the outer periphery and the head of the optical pickup is in the center of the groove track as well. Accordingly, the tracking control section 208 discriminates whether the present track is the land or the groove when the object lens direction detecting section 206 detects the direction of the object lens, and performs the track-on in the center of the groove track when the direction of the object lens is the direction of the outer periphery and the present track is the groove as well.

Here, various kinds of land/groove discriminating methods may be used. In the embodiment of the present invention, the land/groove discrimination is performed using the pulse times T1 and T2.

Specifically, as shown in FIGS. 5(a) to 5(e) through 10(a) to 10(e), the phase slope of the diagonal component is slow based on the RF signal in the groove track where data is written, and the phase slope is abrupt in the land track. Accordingly, the tracking control section 208 compares the pulse times T1 and T2, i.e., the pulse widths, and judges the larger one to be the groove track. That is, the groove track has a relatively small rate of phase variation of the diagonal component based on the RF signal in comparison to the land track.

As described above, according to the method and apparatus for controlling reproduction of an optical recording medium of the present invention, the moving direction of an object lens on a disc is detected from the slope of a DPD error signal in case that the tracking control of the disc is performed by the DPD error signal, and the tracking control is performed using the detected moving direction of the object lens. Thus, the proceeding direction of the object lens can be easily and accurately detected in the disc from which the detection of a mirror signal is not facilitated, i.e., in the disc whose tracking is controlled by the DPD error signal during reproduction.

Also, since it can be easily discriminated whether the phase of the tracking error signal to be in a track-on state when a track servo is turned on corresponds to a land or a groove, the stability of the servo can be secured, and an automatic breaking can be achieved for more rapid track servo operation.

Also, since no track slipping occurs due to the above-described reason, the system can be stabilized, and more stable and rapid data access can be performed.

The present invention can be applied to all DVD-series discs such as DVD-ROM, DVD-RW/R, etc., from which the detection of a mirror signal is not facilitated.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of controlling a servo operation based on a tracking error signal by a differential phase detection (DPD) method, the method comprising the:

determining a slope difference with respect to positive (+) and negative (−) directions of the tracking error signal, the slope difference determined by performing a first comparison of the tracking error signal with a first reference level and outputting a first signal according to the result of the first comparison, performing a second comparison of the tracking error signal with a second reference level and outputting a second signal according to the result of the second comparison, and outputting a third signal based on the first and second signals and comparing times of the third signal generated within an active region of the second signal;

determining a track-on time point from the determined slope difference; and performing a track-on according to the determined track-on time point.

2. The method as claimed in claim 1, wherein the first reference level is determined to be higher than a level of a track center, and the second reference level is determined to be lower than the level of the track center.

3. The method as claimed in claim 1, wherein the step of performing the track-on further comprises the step of detecting a proceeding direction of an object lens from a rate of the time of the third signal generated at a rising edge of the second logic signal to the time of the third signal ending at a falling edge of the second signal.

4. The method as claimed in claim 3, wherein the step of detecting the direction of the object lens judges the direction of the object lens to be a direction of an outer periphery if a pulse width of the third signal generated at the rising edge of the second signal is larger than a pulse width of the third signal ending at the falling edge of the second signal, while judging the direction of the object lens to be a direction of an inner periphery if the pulse width of the third signal generated at the rising edge of the second signal is smaller than the pulse width of the third signal ending at the falling edge of the second signal, and generating a directing signal of the object lens corresponding to a result of judgment.

5. The method as claimed in claim 4, wherein the step of detecting the direction of the object lens changes the direction signal of the object lens if it is judged that the pulse width of the third signal generated at the rising edge of the second signal is the same as the pulse width of the third signal ending at the falling edge of the second signal.

6. The method as claimed in claim 4, wherein the step of detecting the direction of the object lens changes the direction signal of the object lens if it is judged that only a single third signal is generated within an active region of the second signal.

7. The method as claimed in claim 4, wherein the step of detecting the direction of the object lens changes the direction signal of the object lens if it is judged that three or more third signals are generated within an active region of the second signal.

8. The method as claimed in claim 3, wherein at the step of performing the track-on, the track-on is performed in the track center where the proceeding direction of the object lens is judged to be the direction of the outer periphery and the direction having a small rate of phase variation is judged according to the slope difference of the tracking error signal.

9. The method as claimed in claim 1, wherein the step of performing the track-on further comprises the step of judging the direction having a small rate of phase variation according to the slope difference of the tracking error signal to be a groove track.

10. The method as claimed in claim 1, wherein the step of performing the track-on further comprises the step of generating a break pulse signal whose direction is opposite to the moving direction of the object lens if the direction of the object lens is detected.

11. The method as claimed in claim 10, wherein a phase of the break pulse is the same as or opposite to that of a track zero cross signal obtained by slicing the tracking error signal with an internal reference level according to the direction of the object lens.

12. An apparatus for controlling a servo operation based on a tracking error signal by a differential phase detection (DPD) method, the apparatus comprising:
 a slope operation section for containing a slope with respect to positive (+) and negative (−) directions of the tracking error signal; and
 a control section for detecting a proceeding direction of an object lens from the slope, determining a kind of track as one of a land track and a groove track, determining a track-on time point based on the detected proceeding direction of the objective lens and the determined kind of a track, and performing a track control according to the determined track-on time point;
 wherein the slope operation section comprises:
 a first comparison section for comparing the tracking error signal with a first reference level and outputting a first signal of a high or low state according to a result of comparison;
 a second comparison section for comparing the tracking error signal with a second reference level and outputting a second signal of a high or low state according to a result of comparison; and
 a logic operation section for outputting third signal by exclusive-OR-gating the first and second logic signals.

13. The apparatus as claimed in claim 12, wherein the first reference level is determined to be higher than a level of a track center, and the second reference level is determined to be lower than the level of the track center.

14. The apparatus as claimed in claim 12, wherein the control section detects the proceeding direction of the object lens by comparing times of the third signals generated within an active region of the second signal.

15. The apparatus as claimed in claim 12, wherein the control section judges the direction of the object lens to be a direction of an inner periphery if a rate of a time of the third signal generated at a rising edge of the second signal to a time of the third signal ending at a falling edge of the second signal is larger than a predetermined threshold value, while judging the direction of the object lens to be a direction of an outer periphery if the rate of the time of the third signal generated at the rising edge of the second signal to the time of the third logic signal ending at the falling edge of the second signal is smaller than the predetermined threshold value.

16. The apparatus as claimed in claim 15, wherein the threshold value is determined to be a value larger than 1.

17. The apparatus as claimed in claim 12, wherein the control section performs a track-on in a track center where the moving direction of the object lens is judged to be the direction of the outer periphery and the direction having a small rate of phase variation is judged according to the slope difference with respect to the positive (+) and negative (−) directions of the tracking error signal.

18. The apparatus as claimed in claim 12, wherein the control section judges the direction having a small rate of phase variation according to the slope difference between the positive (+) and negative (−) directions of the tracking error signal to be a groove track.

19. The apparatus as claimed in claim 12, further comprising a break pulse generating section for generating a break pulse signal whose direction is opposite to the moving direction of the object lens if the direction of the object lens is detected.

* * * * *